United States Patent Office 3,509,707
Patented May 5, 1970

3,509,707
HINGEDLY INTERCONNECTED ROTARY RAKES
Michael Stampfer, Gottmadingen, Germany, assignor to Maschinenfabrik Fahr Aktiengesellschaft, Gottmadingen, Germany, a German firm
Filed Sept. 6, 1966, Ser. No. 577,335
Int. Cl. A01d 77/06
U.S. Cl. 56—370                                  1 Claim

ABSTRACT OF THE DISCLOSURE

Haymaking machine with interleaved rotary rakes orbiting at a peripheral speed between about 1.5 and 5 times the forward speed of the vehicle for the dispersing of crop material piled in windrows, the hubs of the rakes being mounted at the outer ends of respective hingedly interconnected sections of a tubular beam and driven by respective shaft members inside the beam which are coupled together by universal joints in the regions of the hinges.

---

My present invention relates to a haymaking machine of the type wherein a substantially horizontal elongated support on wheels, usually designed as a trailer to be towed by a tractor, carries a set of rotary rakes which are juxtaposed along the support in a direction transverse to the motion of the unit across a field covered with crop material.

A machine of this type has been described in commonly assigned application Ser. No. 562,710, filed July 5, 1966 by Robert G. Chombart.

Such machines have general utility in picking up loose stalks and redistributing them in various ways on the field, e.g. for piling the crops into windrows or swaths and for tedding the piled-up crops. In order to adapt a given machine to the performance of these various tasks, the rotary rakes may be adjusted at different relative inclinations as more fully described in the aforementioned Chombart application.

Apart from the inclination of the rakes, their rotary speed is also of importance. It has been found, for example, that rotary rakes with generally radial arms having depending prongs attached to their tips, spaced so closely that the orbits of the prongs of adjacent rakes intersect, will pile up the crops in neat windrows behind the advancing vehicle if the peripheral speed of the rakes equals the ground speed of the vehicle whereby, along every other orbital intersection, the prongs remain substantially stationary with reference to the ground so that the stalks would no longer be entrained by the rotating prongs and would drop to the ground.

Less successful have been past attempts to use such machines in tedding operations, i.e. for the uniform spreading of stalks in a substantially even layer behind the machine for the purpose of facilitating the drying of the crops in sunlight after they had been raked, e.g. overnight, into well-separated windrows. Thus, it has been observed that rotary speeds considerably lower than the ground speed would lead to a distribution of the stalks behind the machine in a somewhat irregular layer, the same being true for rotary rake speeds somewhat higher than the ground speed.

The general object of my invention is to provide (a) a machine of the character described which can be operated, without complicated adjustments, for the turning and uniform spreading of crop materials and (b) a method of so operating such machine that this effect is invariably realized even where the forward speed of the vehicle across the field must be varied from time to time because of the nature of the terrain and/or the type of crop to be handled.

I have found, in accordance with this invention, that the foregoing object may be realized by so rotating the rakes of the machine that their peripheral speed is equal to or greater than 1.5 times the forward speed of the vehicle; this mode of operation insures that stalks picked up by the rakes are deposited behind the advancing machine in a substantially even layer.

Although the upper speed limit of the rake motion is not so critical, a practical maximum lies around 5 times the forward speed which, in turn, may range between approximately 3 and 5 meters/second.

Usually, the tractor towing the haymaking machine will also furnish the power for the rotation of its rakes. In accordance with my invention, therefore, the transmission means coupling the rake shafts with their power source on the tractor should be so proportioned as to maintain the rotary rake speed within the aforementioned range of substantially 1.5 to 5 times the forward speed of the unit.

Naturally, the rake axes should all be substantially parallel in order to insure the desired uniformity of the crop layer left in the wake of the machine. Also, these rake axes should be rearwardly and downwardly inclined at a small angle toward the vertical so that their prongs effectively sweep the ground in the forward part of their orbit; I have found that, for best results, this small angle should range between 12° and 28°. Moreover, the speed relation established in accordance with this invention is most effective with rotary rakes having a diameter ranging between substantially 110 and 170 cm.

The relatively high rake speeds conforming to the present invention call for a safe and robust mounting of the driving mechanism on the rake support. For this purpose I prefer to design this support as a tubular beam accommodating in its interior the transmission shaft or shafts for the rakes. If more than two rakes are provided, the outermost rakes may be carried on hinged extensions of the tubular beams whereby, if the transmission shaft is subdivided into endwise adjoining members interconnected by universal joints in the regions of the hinges, the relative elevation of the rakes may be varied in accordance with the terrain to be cultivated.

My invention will be described in greater detail in the following description, reference being made to the appended drawing in which.

Figure 1:
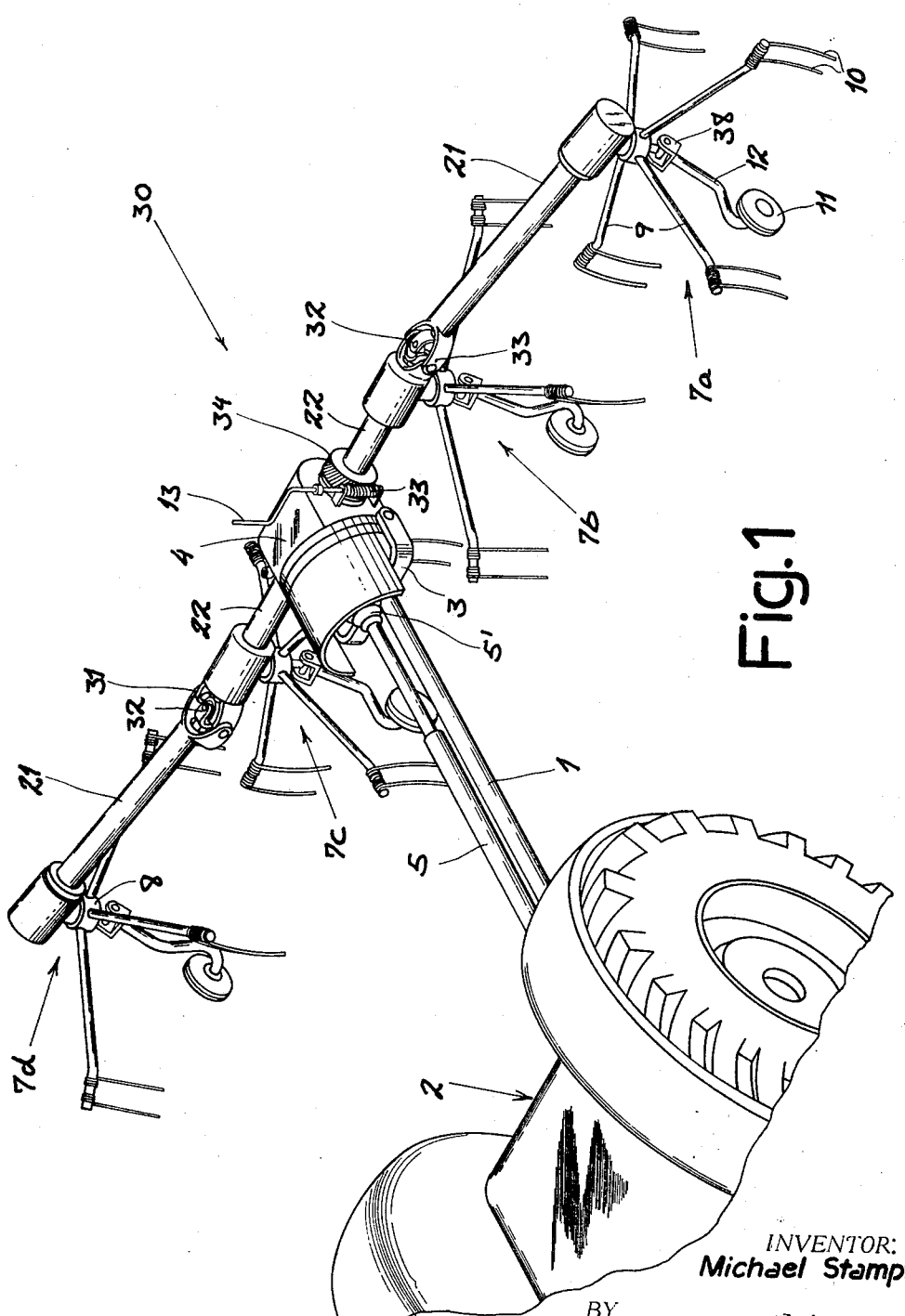
FIG. 1 is a perspective view of a haymaking machine, representing a preferred embodiment, attached to a tractor.
Figure 2:
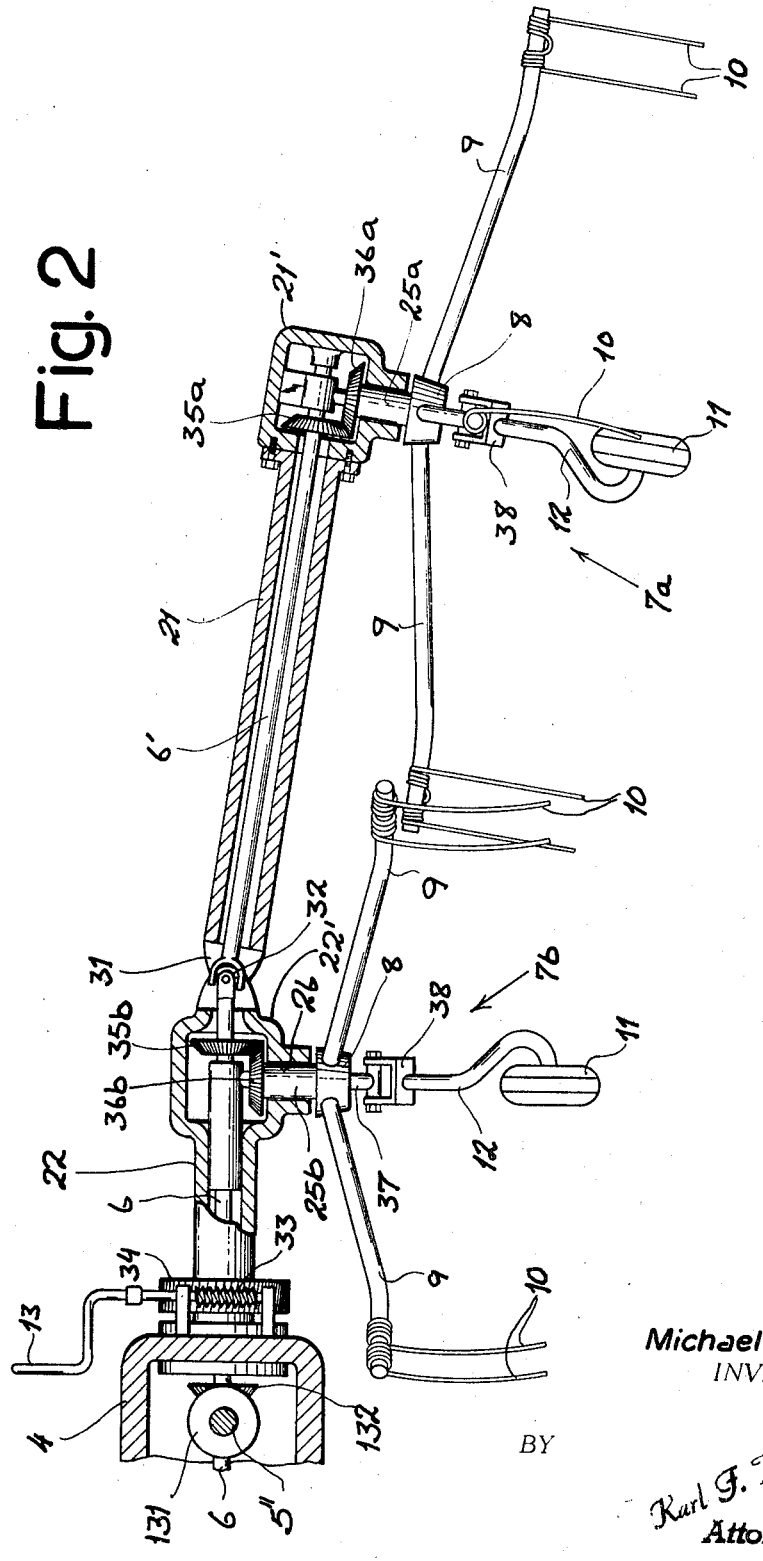
FIG. 2 is a fragmentary view, in longitudinal section, of the supporting structure for the rake assembly of the machine shown in FIG. 1.

As illustrated in FIG. 1, the haymaking unit generally designated 30 is connected with a tractor 2 via a tow bar 1 having a bifurcate rear end 3 pivotally linked with a transmission housing 4. A shaft 6 (FIG. 2) projects transversely from the housing 4 on opposite sides thereof and is driven, by way of an intermediate shaft 5 of variable length, a universal joint 5' and an extension 5" of that shaft as well as two bevel gears 131, 132, from the power take-off shaft (not shown) of the tractor. Shaft 6, together with two lateral extensions 6' thereof (only one shown in FIG. 2), is surrounded on each side of housing 4 by a tubular shell composed of sections 21, 22 hingedly interconnected at 31.

A set of four rotary rakes 7a, 7b, 7c, 7d (see also FIGS. 2 and 3) depend from the supporting structure 21, 22 from which they are suspended with the aid of respective shafts 25a, 25b etc. The two outer shafts, such as shaft 25a, are supported on the free ends of the respective tube sections 21; the two inner shafts, as particularly illustrated for shaft 25b, pass similarly through bores 26 in the tube sections 22. The entire tubular beam 21, 22 is journaled in housing 4 for limited rotation under the control of a worm 33 meshing with a worm gear 34, the worm 33 being fitted with a head engageable by a hand crank 13 for manual rotation to adjust the rearward and downward inclination of the rake shafts 25a, 25b etc.

Shaft 6 and its extension 6', positively connected therewith by universal joints 32 at the hinges 31, carry four bevel gears 35a, 35b etc. which mesh with respective bevel gears 36a, 36b etc. on shafts 25a, 25b etc. journaled in tube sections 21 and 22. Each of the rakes 7a–7d has a center disk 8 or hub from which four arms 9 project substantially radially at right angles to one another, the arms of neighboring rakes being relatively offset by about 45° so that their ends, having pairs of resilient prongs 10 suspended therefrom, intermesh as the rakes rotate in relatively opposite senses; see particularly FIG. 3. The shafts 25a, 25b etc., journaled in enlarged ends 21', 22' (remote from housing 4) of beam sections 21, 22, are tubular and traversed by a fixed stem 37 holding a boss 38 in position beneath disk 8; an arm 12 is adjustably secured to this boss and carries at its lower end a guide wheel 11 suporting the respective rake at a suitable distance above ground.

Figure 3:
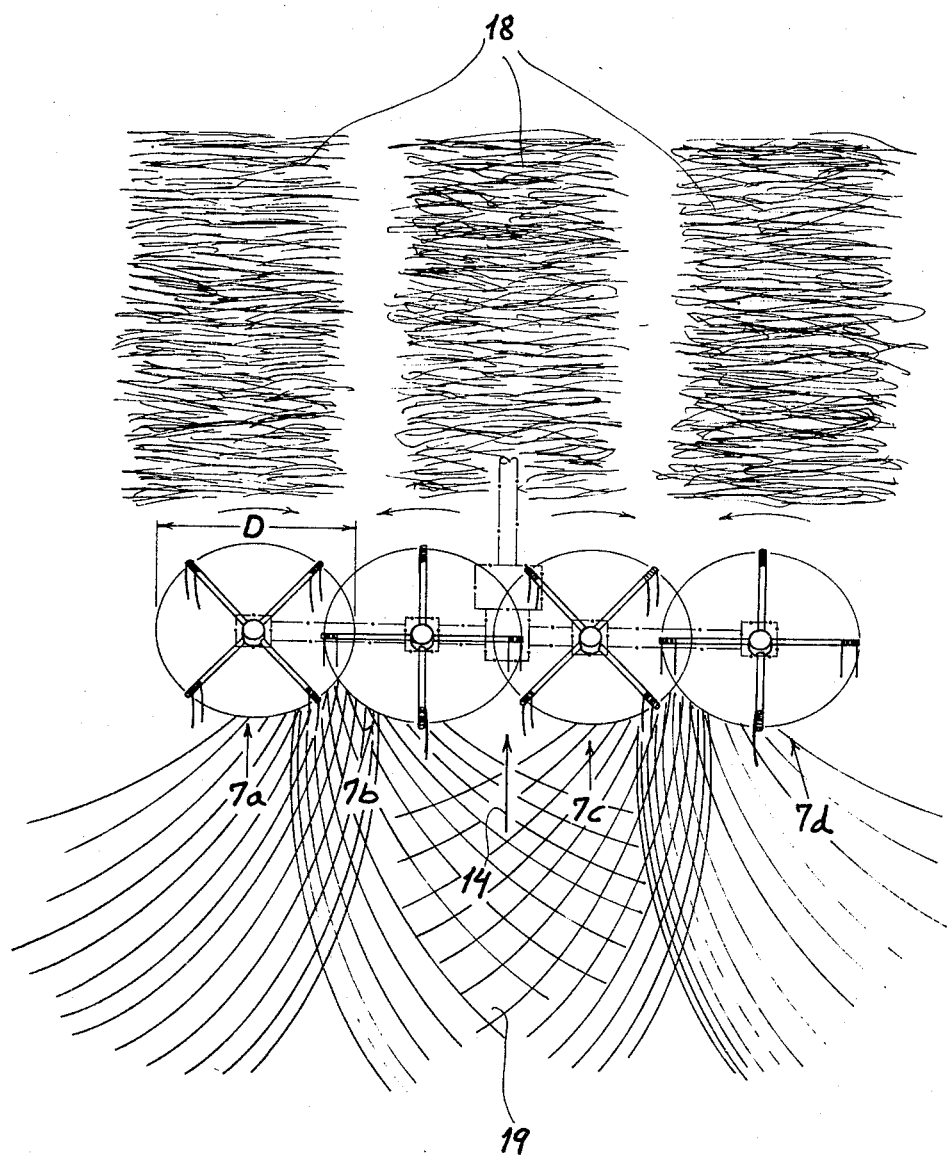
FIG. 3 is a top view of the rake assembly illustrating, somewhat diagrammatically, its mode of operation.

FIG. 3 illustrates how the rakes 7a–7d, rotating alternately in opposite directions on their rearwardly and downwardly inclined shafts, pick up the encountered crop material from windrows 18 along which they advance in the direction indicated by arrow 14; the stalks are then deposited in a uniform layer 19 behind the advancing unit. FIG. 3 also shows the overlapping orbits of the rakes whose diameter D preferably lies within the aforestated limits of approximately 110 and 170 cm. The angle of inclination of shaft 25a, 25b etc. with reference to the vertical should be small and, preferably, within the limits of 12° and 28°.

The transmission 4–6, delivering the torque of the power-take-off shaft of tractor 2 to the rake shafts, should be so dimensioned that, in normal operation, the peripheral speed of the rakes ranges between 1.5 and 5 times the forward speed of the tractor (arrow 14) which in turn may be adjustable, by the usual speed changer interposed between the tractor wheels and its engine, from a minimum of about 3 m./sec. to a maximum of approximately 5 m./sec. The rake speed may be, according to the forward speed and the rake diameter D, on the order of 100 to 300 revolutions per minute.

The number of arms on a rake may be different from that illustrated; thus, rakes with five or six equispaced arms are found to work substantially as well as the four-armed rakes shown in the drawing.

The machine just described will also operate to turn a more or less uniform layer of loose stalks, instead of stalks piled in windrows, e.g. for the purpose of bringing to the surface the stalks previously buried under other crop material so as to expedite their drying.

I claim:

1. A haymaking machine comprising a substantially horizontal tubular beam; wheel means on said beam enabling travel thereof across a field in a direction perpendicular to its principal dimension; shaft means journaled in said beam and extending in the direction of said principal dimension; a plurality of rakes suspended from said beam and coupled with said shaft means for rotation about substantially parallel axes inclined at an angle between 12° and 28° toward the vertical, said rakes having generally radial arms with depending prongs describing intersecting orbits with diameters between substantially 110 and 170 cm. along which the prongs of adjacent rakes are oppositely movable in interleaved relationship; drive means coupled with said beam for advancing same in the direction opposite the direction of downward inclination of said axes at a predetermined forward speed; and transmission means coupling said shaft means with said drive means for rotating said rakes about their respective axes with a peripheral speed ranging between substantially 1.5 and 5 times said forward speed; said shaft means being an assembly of endwise adjoining and positively interconnected shaft members with interposed universal joints, said beam forming a centrally disposed transmission housing and a plurality of hingedly intercornected tube sections on both sides of said housing for enabling relative inclination of adjacent sections in a generally vertical plane about junctions coinciding with said universal joints, each of said sections having an enlarged end remote from said housing, said rakes having hubs journaled on said enlarged ends and being further provided along their axes with supporting wheels having axles secured to said enlarged ends, said hubs and shaft members being provided with meshing bevel gears received in said enlarged ends.

References Cited

UNITED STATES PATENTS 3,267,656  8/1966  Van der Lely _____ 56—370

FOREIGN PATENTS 911,872  11/1962  Great Britain.

ANTONIO F. GUIDA, Primary Examiner